United States Patent
Vidyadhara et al.

(10) Patent No.: US 12,267,315 B2
(45) Date of Patent: Apr. 1, 2025

(54) SYSTEM AND METHOD FOR AUTHENTICATING DEVICES IN DISTRIBUTED ENVIRONMENT

(71) Applicant: Dell Products L.P., Round Rock, TX (US)

(72) Inventors: Sumanth Vidyadhara, Bangalore (IN); Manjunath Gr, Bangalore (IN); Shubham Kumar, Chakradharpur (IN)

(73) Assignee: Dell Products L.P., Round Rock, TX (US)

(*) Notice: Subject to any disclaimer, the term of this patent is extended or adjusted under 35 U.S.C. 154(b) by 607 days.

(21) Appl. No.: 17/526,279

(22) Filed: Nov. 15, 2021

(65) Prior Publication Data
US 2023/0155997 A1    May 18, 2023

(51) Int. Cl.
| | | |
|---|---|---|
| *H04L 29/06* | (2006.01) | |
| *H04L 9/30* | (2006.01) | |
| *H04L 9/32* | (2006.01) | |
| *H04L 9/40* | (2022.01) | |

(52) U.S. Cl.
CPC .............. *H04L 63/083* (2013.01); *H04L 9/30* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 2012/0297468 A1* | 11/2012 | Bharadwaj Subramanya | ............. H04L 69/40 726/7 |
| 2015/0301880 A1* | 10/2015 | Allu | ..................... G06F 11/0709 714/4.3 |
| 2016/0344737 A1* | 11/2016 | Anton | ..................... H04L 9/0891 |
| 2017/0171200 A1* | 6/2017 | Bao | .......................... H04L 9/3213 |
| 2018/0013569 A1* | 1/2018 | Knopf | .................... H04L 9/0891 |
| 2018/0108024 A1* | 4/2018 | Greco | ................. G06K 7/10366 |
| 2019/0028456 A1* | 1/2019 | Kurian | ..................... H04L 63/10 |
| 2019/0190912 A1* | 6/2019 | de Boer | ................... H04L 63/10 |
| 2019/0220583 A1* | 7/2019 | Douglas | ................. G06V 40/70 |
| 2019/0318063 A1* | 10/2019 | Wierzba | ................ H04L 9/3247 |
| 2020/0092287 A1* | 3/2020 | Cano | ................... H04L 63/0884 |

* cited by examiner

*Primary Examiner* — Eleni A Shiferaw
*Assistant Examiner* — Hassan A Hussein
(74) *Attorney, Agent, or Firm* — WOMBLE BOND DICKINSON (US) LLP

(57) ABSTRACT

Methods, systems, and devices for providing for trust in a distributed environment are disclosed. In a distributed environment, various devices may be remote to one another and may interact with one another via one or more operable connections. Through the operable connections, various communications may be exchanged. However, the operable connections may not natively support authentication of any particular device in the distributed system. Consequently, entities in the distributed system may not intrinsically trust that the communications received through the distributed environment are authentic. The entities of the system may mutually authenticate one another prior to trusting communications from the other entities. For example, in a scenario where a client wishes to access data hosted by a data source, the client and data source may go through a process of mutually authenticating one another. By doing so, a trusted environment may be established.

20 Claims, 13 Drawing Sheets

SYSTEM AND METHOD FOR AUTHENTICATING DEVICES IN DISTRIBUTED ENVIRONMENT

FIELD DISCLOSED HEREIN

Embodiments disclosed herein relate generally to authentication. More particularly, embodiments disclosed herein relate to systems and methods for mutual authentication in a distributed system.

BACKGROUND

Computing devices may provide various services. For example, computing devices may host applications that store data, process data, and generate data thereby providing services. Depending on the type of processing performed, various types of services may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
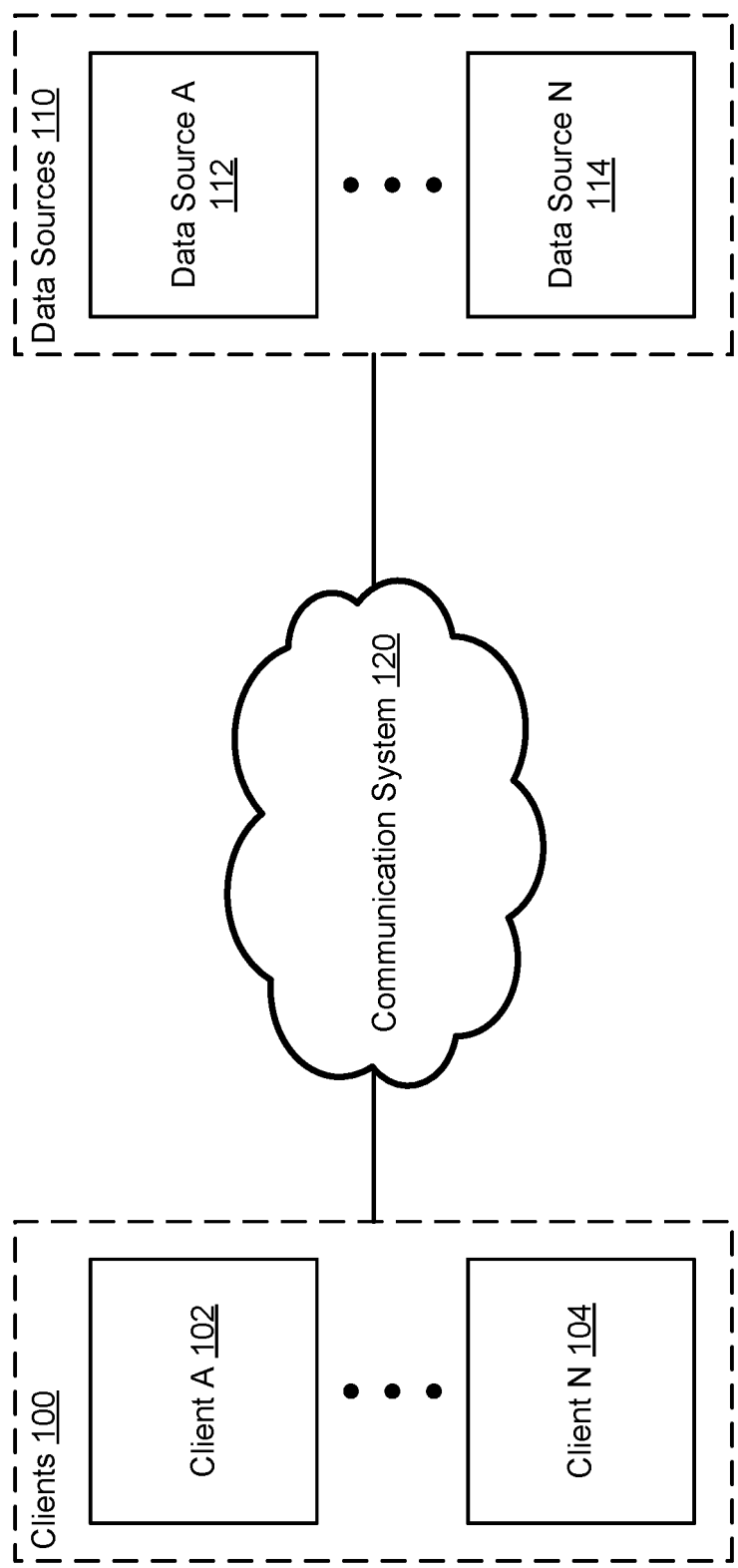
FIG. 1 shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment. References in the specification to an "operably connection" or devices that are "operably connected" may indicate that the devices and/or connection are capable of supporting communications between devices. The devices when "operably connected" may be connected directly or indirectly (e.g., through one or more intermediary devices) to each other.

In general, embodiments disclosed herein relate to methods, systems, and devices for providing for trust in a distributed environment. In a distributed environment, various devices may be remote to one another and may interact with one another via one or more operable connections. Through the operable connections, various communications may be exchanged.

However, the operable connections may not natively support authentication of any particular device in the distributed system. Consequently, entities in the distributed system may not intrinsically trust that the communications received through the distributed environment are authentic.

In an embodiment, the entities of the system may mutually authenticate one another prior to trusting communications from the other entities. For example, in a scenario where a client wishes to access data hosted by a data source, the client and data source may go through a process of mutually authenticating one another. By doing so, a trusted environment may be established.

To facilitate mutual authentication, in an embodiment, verification data used for startup data verification is utilized as a pre-shared secret for mutual authentication purposes. For example, when a device starts up, it may do so using a collection of data (e.g., computer code, configuration settings, etc.). However, if the collection of data is compromised, using the collection of data for startup may give rise to a compromised entity that does not operate in a predetermined state. To reduce the likelihood of this occurring, verification data usable to check the contents of the collection of data may be maintained by entities of the distributed system. By checking the contents of the collection of data, prior to use for startup purposes, the entities may be more likely to enter the predetermined (e.g., desired) operating state rather than a compromised operating state.

To facilitate authentication using the verification data, various entities may store copies of verification data for other entities (e.g., in addition to verification data for themselves). By doing so, the verification data may be used as a pre-shared secret and a trusted environment may be established that allows for the various entities in the system to authenticate one another with limited overhead.

In an embodiment, a computer-implemented method for securing data in a data source using tokens is provided. The method may include performing, by the data source, a first authentication of a client using: a copy of a service tag of the client stored in the data source, and a copy of a first portion of startup data stored in a startup data storage of the client, the copy of the portion of the startup data being stored in the data source and the service tag being used to identify the copy of the portion of the startup data for use during the authentication; performing, by a client, a second authentication of the data source using: the copy of the service tag of the client stored in the data source, and a copy of a second portion of startup data stored in the startup data storage of the client, the copy of the second portion of the startup data being stored in the data source and the service tag being used to identify the copy of the portion of the startup data for use during the authentication; when the first authentication of the client indicates that the client is authentic and the second authentication of the data source indicates that the data source is authentic, providing, by the data source, a token to the client, the token being usable to access secured data stored in the data source; and when either the first authentication or the second authentication indicates that one of the client and the data source are not authentic, denying the client access to secure data in the data source.

The first portion of the startup data may be usable to verify a portion of data usable to startup operation of the client. The second portion of the startup data may be usable to verify all data usable to startup operation of the client.

The first portion may include a signature of computer code of a startup entity, the signature and computer code may be stored in a secure storage device of the client.

Performing the first authentication may include providing a hash of the service tag to the data source; making a determination, by the data source, that the hash indicates that the client may be a known entity; in response to the determination: generating a challenge based on the copy of the first portion of the startup data; and presenting the challenge to the client; receiving a response to the presented challenge from the client; and using the challenge response to determine whether the client is authentic.

Performing the first authentication may only authenticate the client to the data source.

Performing the second authentication may include performing a key exchange between the client and the data source to provide the data source with a public key; generating an authentication package with the public key and the copy of the second portion of startup data stored in the startup data storage of the client; and providing the generated authentication package to the client.

In an embodiment, a client for providing computer implemented services using secured data stored in a data source is provided. The client may include startup storage for storing startup data and verification data usable to verify that the startup data will give rise to a predetermined entity when the startup data is executed by the client; memory; and a processor adapted to execute computer instructions that cause the processor to: perform a first authentication of the client to the data source using: a service tag of the client, and a portion of the verification data; perform a second authentication of the data source to the client using: all of the verification data; when the first authentication indicates that the client is authentic and the second authentication indicates that the data source is authentic, obtaining a token usable to access secured data stored in the data source; and when the second authentication indicates that the data source is not authentic, aborting attempts to access the secured data.

The portion of the verification data may include a signature of a portion of the startup data.

Performing the first authentication may include providing a hash of the service tag to the data source; after providing the hash: obtaining a challenge based on the portion of the verification data; generating a response to the challenge, the response being based on the portion of the verification data; and using the challenge response to authenticate the client to the data source.

The challenge may indicate the portion of the verification data.

Performing the first authentication may only authenticate the client to the data source.

The challenge may select a different portion of the verification data each time the client is challenged.

Performing the second authentication may include performing a key exchange with the data source to obtain publicly known numbers usable to obtain a public key for the client; obtaining an authentication package from the data source, the authentication package being based, at least in part, on the key exchange; segregating the authentication package into a second public key for the data source and a copy of all of the authentication data; and comparing the copy of all of the authentication data and the authentication data stored in the startup storage to obtain an authentication status for the data source.

In an embodiment, a data source for securing data is provided. The data source may include storage for storing a copy of verification data stored in a client; memory; and a processor adapted to execute computer instructions that cause the processor to: perform a first authentication of the client to the data source using: a service tag of the client, and a portion of the copy of the verification data; perform a second authentication of the data source to the client using: all of the copy of the verification data; when the first authentication indicates that the client is authentic and the second authentication indicates that the data source is authentic, providing a token to the client usable to access secured data stored in the data source; and when the first authentication indicates that the client is not authentic, preventing the client from accessing the data.

The portion of the copy of the verification data may include a signature of a portion of startup data usable by the client to enter a predetermined state.

Performing the first authentication may include providing a hash of the service tag to the data source; after providing the hash: obtaining a challenge based on the portion of the verification data; generating a response to the challenge, the response being based on the portion of the verification data; and using the challenge response to authenticate the client to the data source.

The challenge may indicate the portion of the verification data.

Performing the first authentication may only authenticate the client to the data source.

Performing the second authentication may include performing a key exchange with the client to obtain publicly known numbers usable to obtain a public key; generating an authentication package based, at least in part, on the key exchange and all of the copy of the authentication data; providing the authentication package to the client; and receiving a public key from the client when the client authenticates the data source using the authentication package.

Turning to FIG. 1, a block diagram illustrating a system in accordance with an embodiment is shown. The system of FIG. 1 may facilitate securing of data in a distributed system while providing authorized entities with access to the data. The secured data may include any type and quantity of data such as, for example, startup data usable to start operation of one or more devices.

To provide the aforementioned functionality, the system shown in FIG. 1 may include any number of clients 100 and data sources 110. Clients 100 may provide any number and type of computer implemented services. Different clients (e.g., 102, 104) may perform similar or different services.

The computer implemented services may include, for example, database services, instant messaging services, video conferencing services, etc. To provide these services, clients 100 may host applications (not shown) that provide these (and/or other) computer implemented services. The applications (or other types of executing entities) may presume (and/or may require for proper operation of the applications) that clients 100 operate in a predetermined manner. The predetermined manner of operation may include, for example, hosting an operating system, drivers, or other types of management entities that mediate, facilitate, or otherwise manage the operation of clients 100 in a manner which enables the applications to operate (e.g., by providing abstracted access to hardware resources used in the execution of the applications).

To operate in the predetermined manner, clients 100 may perform one or more operations to enter the predetermined manner of operation (by changing from other manners of operation to the predetermined manner of operation). These operations may include, for example, performing a boot process from a power-on (or reset or other manner of operation that differs from the predetermined manner of operation to the extent that the applications may not be able to operate) to handing off management of clients 100 to an operating system or other type of operational management entity that places client 100 into the predetermined manner of operation. The operating system may, for example, provide abstracted access to resources utilized by the applications, manage data storage and data retrieval, etc.

For example, consider a scenario where a client has been shut off. After the client is turned on, the client may be operating in a startup manner during which the client may not be able to support execution of an application (e.g., the application may not be able to successfully execute until the client hosts an operating system). To enter the predetermined manner of operation conducive to execution of applications, the client may go through a boot process which may be performed by a type of management entity such as a basic input-output system and/or other type of startup management entity. The startup management entity may perform any number of actions (e.g., a "boot process") to prepare the client to begin execution of an operating system or other type of management entity.

Over time, clients 100 may update their operation and/or process of entering the predetermined state using data stored in other devices, such as data sources 110. Clients 100 may utilize data from data sources 110 for other purposes. Different data sources (e.g., 112, 114) may host similar and/or different data.

In an embodiment, at least some of the data in data sources 110 is sensitive data. To prevent unauthorized access to the sensitive data, embodiments disclosed herein provide methods and systems for managing secured data in data sources. The data may be managed by requiring that a mutual authentication between a client and data source be completed prior to the client being allowed to access the data stored in a data source.

To perform the mutual authentication, startup data stored in clients 100 and copies of the startup data stored in data sources 110 may be utilized as a pre-shared secret. The pre-shared secret may be utilized to allow clients 100 and data sources 110 to authenticate one another.

Clients 100 and data sources 110 may also utilize copies of services tags for clients 100 as additional pre-shared secrets. The copies of service tags and copies of startup data may be used to reduce the likelihood of the data in data sources 110 being accessed by unauthorized entities while limiting overhead imposed on the distributed environment for authentication purposes.

Once a client is authenticated by a data source, the data source may provide the client with a token. The token may be usable to access data secured in the data source. For example, the client may provide a copy of (or data derived from) the token along with a data access request to access the data stored in a data source. If the data source is able to verify that the token is live (e.g., was previously issued by the data source), then the data source may provide the client with the requested data. Otherwise, the data source may deny the client access to the data.

Any of clients 100 and data sources 110 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6. For additional details regarding clients 100, refer to FIG. 2A. For additional details regarding data sources 110, refer to FIG. 2B.

In an embodiment, one or more of clients 100 and data sources 110 are operably connected via communication system 120. Communication system 120 may allow any of clients 100 and data sources 110 to communication with one another (and/or with other devices not illustrated in FIG. 1). To provide its functionality, communication system 120 may be implemented with one or more wired and/or wireless networks. Any of these networks may be private, public, and/or may include the Internet. For example, clients 100 may be operably connected to one another via a local network which is operably connected to the Internet. Similarly, data sources 110 may be operably connected to one another via a second local network which is also operably connected to the Internet thereby allowing any of clients 100 and data sources 110 to communication with one another and/or other devices operably connected to the Internet. Clients 100, data sources 110, and/or communication system 120 may be adapted to perform one or more protocols for communicating via communication system 120.

While illustrated in FIG. 1 with a limited number of specific components, a system may include additional, fewer, and/or different components without departing from embodiments disclosed herein.

Figure 2A:
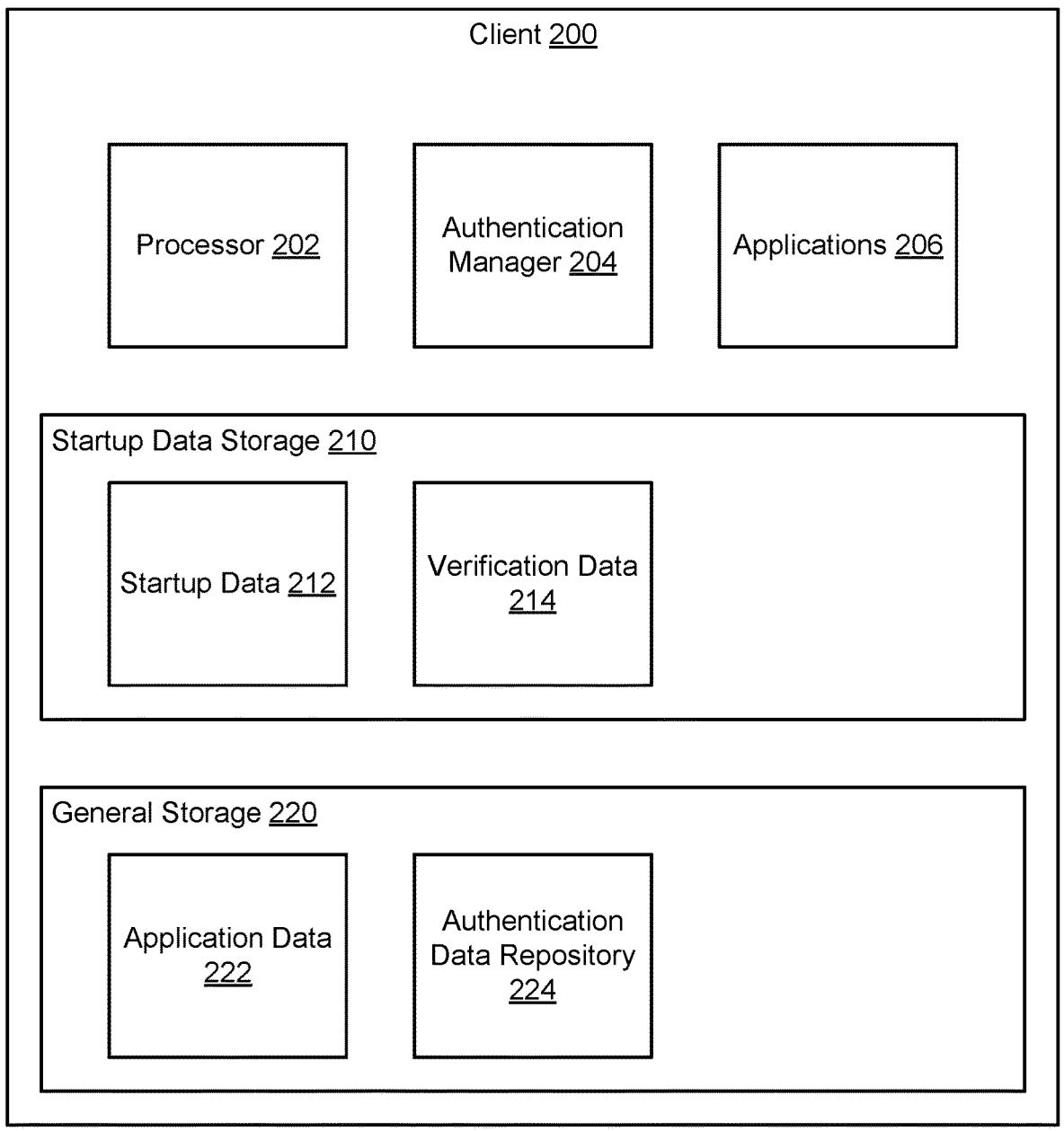
FIG. 2A shows a block diagram illustrating a client of a system in accordance with an embodiment.

Turning to FIG. 2A, a block diagram of an example client 200 in accordance with an embodiment is shown. Client 200 may be similar to any of clients 100 illustrated in FIG. 1.

As discussed above, client 200 may provide computer implemented services by entering into a predetermined state. Over time, the predetermined state may change. To improve the likelihood of client 200 entering the predetermined state as it changes over time, client 200 may perform one or more authentications prior to modifying the data that it uses to entering the predetermined state (e.g., to enter a modified predetermine state). Similarly, client 200 may perform the one or more authentications prior to obtaining and/or providing data to other entities to reduce the likelihood of client 200 be compromised and/or undesired disclosure of sensitive data.

To provide the above noted functionality, client 200 may include processor 202, authentication manager 204, applications 206, startup data storage 210, and general storage 220. Each of these components is discussed below.

Processor 202 may be (and/or include) a hardware processor such as, for example, a central processing unit, a core of a processor, an embedded processor, a controller, and/or any other type of hardware processor. Processor 202 may execute computer code and provide corresponding functionalities when various computer code is executed. Upon startup of client 200, processor 202 may automatically start execution of computer code (e.g., part of startup data 212) in startup data storage 210 and otherwise use the data in startup data storage 210 for startup purposes.

Once processor 202 begins to execute the computer code in startup data storage 210, processor 202 may perform the functionality of a startup management entity thereby eventually placing client 200 in a predetermined operating state conducive to application execution. When in the predetermined operating state, applications 206 may begin executing with processor 202 to provide any number and quantity of computer implemented services.

As part of the process of entering the predetermine operating state (e.g., by loading drivers, operating systems, perform hardware and/or software component checks, etc.), verification data 214 may be used to check startup data 212. Verification data may include, for example, signatures, checksums, and/or other information usable to ascertain whether startup data 212 corresponds to code that when executed by processor 202 causes client 200 to enter the predetermined operating state.

In an embodiment, verification data 214 includes different portions corresponding to various portions of startup data 212. Consequently, startup data 212 may be checked on a portion by portion basis. Each of the portions of verification data 214 may be indexed or may otherwise be identifiable such that client 200 may be able to identify corresponding portions of verification data 214 using corresponding references (e.g., identifiers of portions).

In an embodiment, verification data 214 includes cryptographic data usable to verify the computer code of startup data 212 is for a trusted startup management entity.

Authentication manager 204 may provide authentication services. The authentication services may include (i) authenticating client 200 to other entities such as data sources 110, (ii) authenticating other entities such as data sources 110, and/or (iii) managing and/or using data structures for accessing data stored with other entities such as data sources. When providing the authentication services, authentication manager 204 may utilize data structures stored in authentication data repository 224.

Authentication data repository 224 may include information usable to authenticate client 200 and access data. For example, authentication data repository 224 may include a service identifier of client 200 and/or copies of any tokens issued to client 200.

When authenticating client 200 to other entities, authentication manager 204 may use a service tag associated with client 200 and portions of verification data 214 to establish its identity to another entity. Likewise, when authenticating another entity (e.g., a data source), authentication manager 204 may utilize all, or a portion, of verification data 214. For example, authentication manager 204 may utilize verification data 214 and/or a service tag as a pre-shared secret that allows client 200 and other entities (e.g., which may have access to copies of these data structures) to authenticate one another.

When providing its functionality, authentication manager 204 may perform all, or a portion, of the methods illustrated in FIGS. 3A-4C.

In an embodiment, authentication manager 204 is implemented using a hardware device including circuitry. The hardware device may be, for example, a digital signal processor, a field programmable gate array, or an application specific integrated circuit. The circuitry may be adapted to cause the hardware device to perform the functionality of authentication manager 204. Authentication manager 204 may be implemented using other types of hardware devices without departing embodiment disclosed herein.

In one embodiment, authentication manager 204 is implemented using a processor adapted to execute computing code stored on a persistent storage that when executed by the processor performs the functionality of authentication manager 204 discussed throughout this application. The processor may be a hardware processor including circuitry such as, for example, a central processing unit, a processing core, or a microcontroller. The processor may be other types of hardware devices for processing information without departing embodiment disclosed herein.

Applications 206 may provide computer implemented services and may be hosted by processor 202 (e.g., may exist when processor 202 executes computer instructions corresponding to applications 206). Applications 206 may provide any number and type of computer implemented services. However, applications 206 may presume that client 200 is operating in a predetermined manner (e.g., hosting an operating system, drivers, etc.). Thus, applications 206 may not operate if client 200 is not in the predetermined manner of operating.

When operating, applications 206 may generate, access, and/or otherwise utilize application data 222. Application data may store any quantity and type of data usable by applications 206 to provide all, or a portion, of their functionalities.

Startup data storage 210 may be implemented with one or more physical storage devices. The physical storage devices may include, for example, a non-volatile storage device such as a flash memory chip.

In an embodiment, startup data storage 210 is operably connected to processor 202 via a serial peripheral interface (SPI) bus. Generally, the SPI bus may only support a point to point operable connection thereby only allowing for startup data storage 210 to be operably connected to processor 202. The data in startup data storage 210 may not be generally accessible via other devices, components, entities, etc.

General storage 220 may be implemented with any number and quantity of storage devices such as, for example, hard disk drives, solid state drives, device controllers, memory devices, and/or other types of device usable to provide for the persistent storage of data. In contrast to startup data storage 210 which may generally be restricted for the storage of certain types of data usable for startup purposes, general storage 220 may provide for the general storage of data. For example, when applications 206 use data, the data may be stored in general storage 220.

In an embodiment, general storage 220 is operably connected to processor 202 via a different bus from that which connects startup data storage 210 to processor 202. For example, general storage 220 may be operably connected to other devices such as processor 202 via a serial ATA interface, a peripheral component interconnect interface, a fabric (e.g., Non-Volatile Memory Express Over Fabric (NVMe-of) interface), and/or any type and/or combination of communications interfaces and corresponding network topologies. While illustrated in FIG. 2A as being part of client 200, in an embodiment, general storage 220 is remote to client 200 and is connected to processor 202 via a network (not shown) which may be part of an NVMe-oF or other type of communication topology that supports remote data access for storage devices.

While illustrated in FIG. 2A with a limited number of specific components, a client may include additional, fewer, and/or different components without departing from embodiments disclosed herein.

Figure 2B:
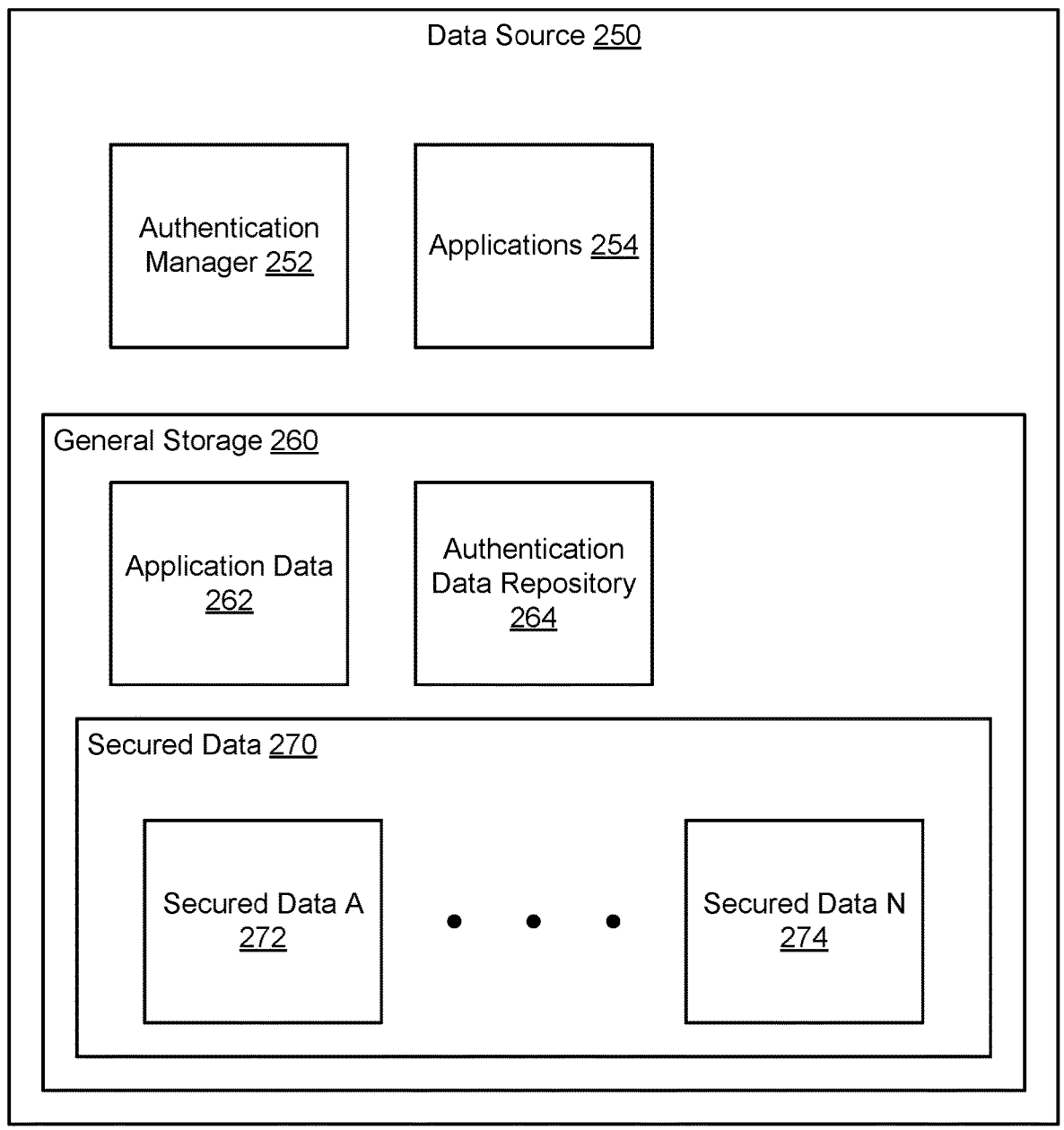
FIG. 2B shows a block diagram illustrating data source of a system in accordance with an embodiment.

Turning to FIG. 2B, a block diagram of an example data source 250 in accordance with an embodiment is shown. Data source 250 may be similar to any of data sources 110 illustrated in FIG. 1.

As discussed above, data source 250 may host data usable by clients. Data source 250 may restrict access to the hosted data to only those entities that have been authenticated (e.g., thereby reducing the likelihood of unintended recipients gaining access to the data). Once authenticated, data source 250 may provide an entity with a token or other type of data structure usable to efficiently identify that the entity has been previously authenticated. When data access for secured data are obtained, data source 250 may only service those requests that also include a token.

To provide the above noted functionality, data source 250 may include authentication manager 252, applications 254, and general storage 260. Each of these components is discussed below.

Authentication manager 252 may provide authentication services. The authentication services may include (i) authenticating data source 250 to other entities such as clients 100, (ii) authenticating other entities such as clients 100, (iii) deploying tokens to authenticated entities, and/or (iv) servicing data access requests. When servicing data access requests, authentication manager 252 may restrict access to secured data 270 unless a token (e.g., that is valid) is provided by the requesting entity.

When authenticating data source 250 to other entities and/or authenticating other entities, authentication manager 252 may use data in authentication data repository 264. Authentication data repository may include (i) information regarding service tags of clients such as hashes of the service tags (or other types of information usable to ascertain whether an entity has been identified and/or to identify an entity), (ii) information regarding verification data hosted by the clients, and/or (iii) information regarding tokens deployed to clients. By doing so, data source 250 may reduce the likelihood of unauthorized entities gaining access to secured data while allowing authorized entities to gain access to the secured data.

When providing its functionality, authentication manager 252 may perform all, or a portion, of the methods illustrated in FIGS. 3A-4C.

In an embodiment, authentication manager 252 is implemented using a hardware device including circuitry. The hardware device may be, for example, a digital signal processor, a field programmable gate array, or an application specific integrated circuit. The circuitry may be adapted to cause the hardware device to perform the functionality of authentication manager 252. Authentication manager 252 may be implemented using other types of hardware devices without departing embodiment disclosed herein.

In one embodiment, authentication manager 252 is implemented using a processor adapted to execute computing code stored on a persistent storage that when executed by the processor performs the functionality of authentication manager 252 discussed throughout this application. The processor may be a hardware processor including circuitry such as, for example, a central processing unit, a processing core, or a microcontroller. The processor may be other types of hardware devices for processing information without departing embodiment disclosed herein.

Applications 254 may provide computer implemented services. Applications 254 may provide any number and type of computer implemented services.

When operating, applications 254 may generate, access, and/or otherwise utilize application data 262. Application data may store any quantity and type of data usable by applications 206 to provide all, or a portion, of their functionalities.

General storage 260 may be implemented with any number and quantity of storage devices such as, for example, hard disk drives, solid state drives, device controllers, memory devices, and/or other types of device usable to provide for the persistent storage of data.

General storage 260 may store data structures including application data 262, authentication data repository 264, and secured data 270. Each of these data structures is discussed below.

Application data 262 may include one or more data structures that include any quantity of application. The application data may be utilized and/or managed by applications 254.

Authentication data repository 264 may include one or more data structures that includes information usable to (i) authenticate data source 250 to other entities, (ii) authenticate other entities to data source 250, and/or (iii) manage access to secured data 270.

For example, authentication data repository 264 may include validation data for any number of clients, service tags associated with any number of clients, hashes of service tags, and/or other information that may serve, in part, as a pre-shared secret for data source 250 and clients.

In another example, authentication data repository 264 may include lists or other information regarding entities that have already been authenticated. In an embodiment, a client may initiate an authentication by sending a hash of its service tag to data source 250. Data source 250 may compare the hash to a list of hashes associated with entities that are authorized to access secured data 270. The list may also specify whether the entity has already been authenticated. If a hash that has been previously used to authenticate an entity is received, the authentication may be aborted and the entity attempting the authentication may be treated as not being authenticated.

In a further example, authentication data repository 264 may include lists or other information regarding tokens that have been issued. The information may include, for example, associations with entities to which the tokens have been issued, the contents of the tokens, and/or other information which may be used by data source 250 to secure secured data 270 with the tokens.

Secure data 270 may include one or more data structures that include information that may be sensitive. For example, secured data 270 may include portions of startup data (e.g., an image of a BIOS), settings for performing a startup of an entity, security information, and/or other information which may be secured in the system of FIG. 1. Secured data 270 may include any quantity and type of secured data. The secured data may be divided into portions (e.g., 272, 274) and/or access to the various portions may be restricted (e.g., keyed to tokens such that tokens may only provide for access to some of secured data 270).

In an embodiment, any of general storage 220, 260 is implemented using physical devices that provide data storage services (e.g., storing data and providing copies of previously stored data). The devices that provide data storage services may include hardware devices and/or logical devices. For example, any of general storage 220, 260 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, any of general storage 220, 260 may include a memory device (e.g., a dual in line memory device) in which data is stored and from which copies of previously stored data are provided. In another example, any of general storage 220, 260 may include a persistent storage device (e.g., a solid-state disk drive) in which data is stored and from which copies of previously stored data is provided. In a still further example, any of general storage 220, 260 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Any of general storage 220, 260 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The data structures stored in any of general storage 220, 260 may be implemented using, for example, lists, tables, unstructured data, trees, databases, etc. While illustrated in FIG. 2A as being stored locally, any of the data structures may be stored remotely and may be distributed across any number of devices without departing from embodiments disclosed herein. Additionally, any of the data structure may include different, less, and/or additional information without departing from embodiments disclosed herein.

While illustrated in FIG. 2A with a limited number of specific components, a client may include additional, fewer, and/or different components without departing from embodiments disclosed herein.

As discussed above, the components of FIG. 1 may perform various methods to secure data and facilitate access to the secured data to authenticated entities. FIGS. 3A-5 illustrates examples of methods that may be performed by the components of FIG. 1. For example, authentication managers of the respective components may perform any or all of the operations shown in these figures. In the diagrams discussed below and shown in FIGS. 3A-5, any of the operations may be repeated, performed in different orders, and/or performed in parallel with or in a partially overlapping in time manner with other operations.

Figure 3A:
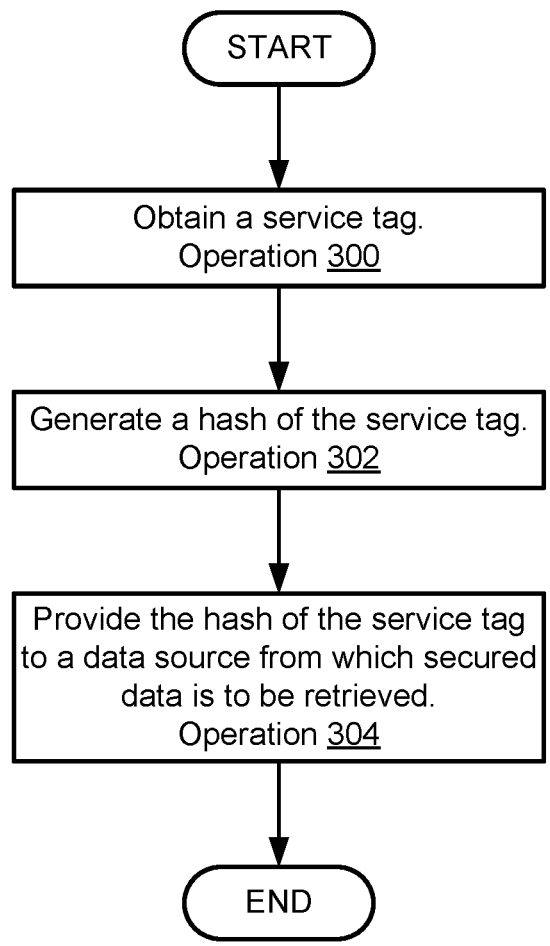
FIG. 3A shows a flow diagram illustrating a method of initiating a mutual authentication in accordance with an embodiment.

Turning to FIG. 3A, a flow diagram illustrating a method of initiating an authentication of a client to a data source in accordance with an embodiment is shown. The method illustrated in FIG. 3A may be performed prior to a client accessing secured data in a data source. For example, the method may be performed when a client initially requests or desires access to secured data in a data source.

At operation 300, a service tag is obtained. The service tag may be for a client desiring access to data in a data source and that has not been authenticated to the data source (the data source may also not be authenticated to the client. The service tag may be obtained by, for example, reading it from an authentication repository. For example, when the client is deployed, the service tag may be present in an authentication data repository hosted by the client.

At operation 302, a hash of the service tag is generated. The hash may be generated by applying a hashing algorithm to the service tag. The hashing algorithm may be, for example, SHA256. The hashing algorithm may be other types of hashing algorithms. In an embodiment, the hash algorithm is collision free or has a low enough collision rate that a collision between two service tags is unlikely. Thus, a unique hash corresponding to a unique service tag may be generated by generating the hash of the service tag. In an embodiment, the hash is stored in the authentication data repository and is generated by reading it from the repository. Prior to operation 302, a data source to which the client wishes to obtain data from already is pre-programmed with a copy of the hash generated in operation 302. In an embodiment, the copy of the hash may be dynamically generated rather than being pre-programmed. For example, the hash may be calculated with the hashing algorithm rather than having a copy of the hash already being stored.

At operation 304, the hash of the service tag is provided to the data source from which secured data is to be retrieved. The hash may be provided by sending it to the data source via a communication system. For example, the hash may be encoded in a protocol compliant data unit and transmitted to the data source via the communication system. Upon receipt of the protocol compliant data unit (or multiple units if spanned across multiple units), the hash may be reconstructed by the data source.

The method may end following operation 304.

Upon completion of operation 304, neither the client nor the data source may be authenticated to one another. However, providing the hash of the service tag to the data source may prompt the data source to issue a challenge to the client. Refer to FIGS. 3C-3D for details regarding the operation of the data source.

Figure 3B:
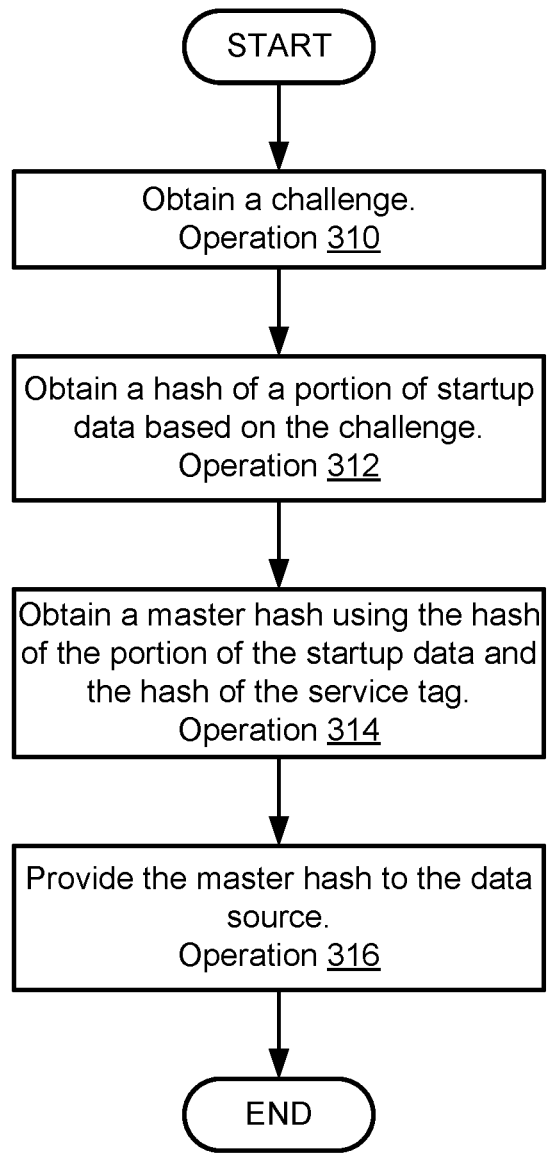
FIG. 3B shows a flow diagram illustrating a method of performing a first portion of a mutual authentication in accordance with an embodiment.
Figure 3C:
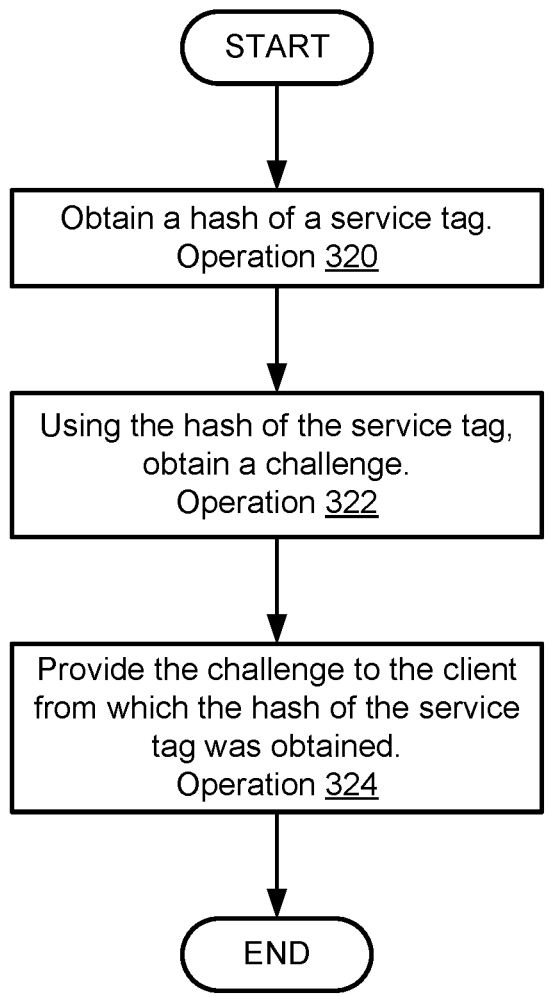
FIG. 3C shows a flow diagram illustrating a method of performing a second portion of a mutual authentication in accordance with an embodiment.
Figure 3D:
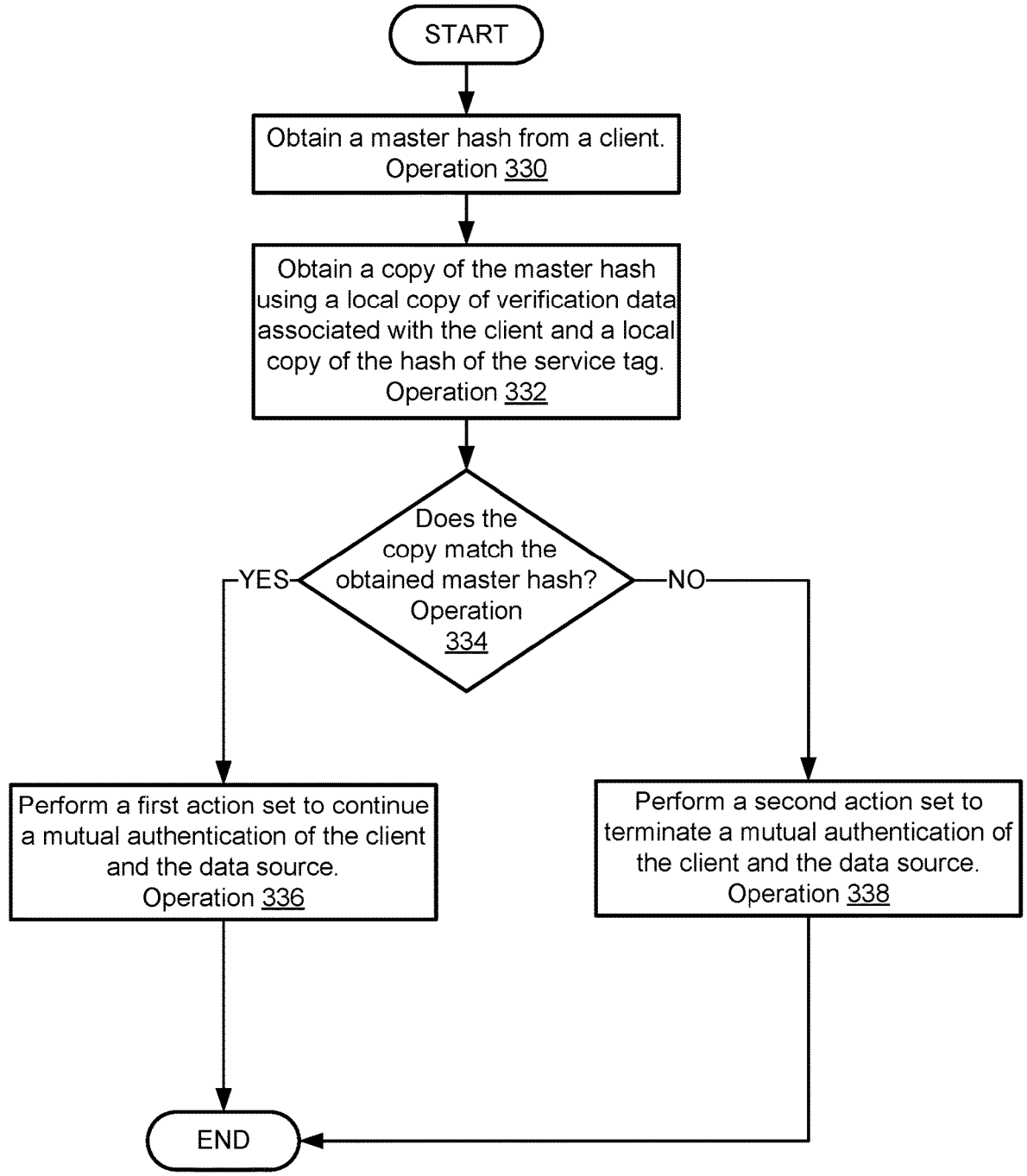
FIG. 3D shows a flow diagram illustrating a method of performing a third portion of a mutual authentication in accordance with an embodiment.

Turning to FIG. 3B, a flow diagram illustrating a method of continuing an authentication of a client to a data source in accordance with an embodiment is shown. The method illustrated in FIG. 3B may be performed prior to a client accessing secured data in a data source. For example, the method may be performed when a client initially requests or desires access to secured data in a data source.

At operation 310, a challenge is obtained. The challenge may be obtained from the data source. The data source may provide the challenge to the client in response to receiving the hash of the service tag (e.g., presuming that the data source had not already received the hash of the service tag from another entity which it previously authenticated, in such cases the data source may presume that the entity that sent the service tag is not authentic and abort the authentication).

In an embodiment, the challenge is an instruction to provide the data source with a copy of a specific portion of verification data associated with the client. For example, the challenge may include an identifier which identifies the specific portion (e.g., if the portions are numbered, the identifier may be a number corresponding to the portion; in some case the identifier may be a range identifier for a flash storage device in which the verification data is stored).

At operation 312, a hash of a portion of startup data is obtained based on the challenge. The hash may be obtained by applying a hash function to a portion of verification data indicated by the challenge. In an embodiment, the hash function is SHA256. The hash function may be other types of hash functions without departing from embodiments disclosed herein.

At operation 314, a master hash is obtained using the hash of the portion of the startup data and the hash of the service tag. For example, the hash of the service tag may be joined with the hash obtained in operation 312 to obtain the master hash.

At operation 316, the master hash is provided to the data source. The master hash may be provided by sending it to the data source via a communication system. For example, the master hash may be encoded in a protocol compliant data unit and transmitted to the data source via the communication system. Upon receipt of the protocol compliant data unit (or multiple units if spanned across multiple units), the master hash may be reconstructed by the data source (e.g., by removing control information and/or other types of data appended to portions of the master hash to facilitate network transport).

The method may end following operation 316.

After operation 316, the data source may not yet have completed authentication of the client, but the data source may have all of the data that it needs to make an authentication determination.

Turning to FIG. 3C, a flow diagram illustrating a method of continuing an authentication of a client to a data source in accordance with an embodiment is shown. The method illustrated in FIG. 3C may be performed prior to a client accessing secured data in a data source. For example, the method may be performed when a client initially requests or desires access to secured data in a data source.

At operation 320, a hash of a service tag is obtained. The service may be of a client that may desire to be authenticated by a data source. The hash may be obtained by receiving it from the client via a communication system. For example, the hash may be encoded in a protocol compliant data unit and transmitted to the data source via the communication system. Upon receipt of the protocol compliant data unit (or multiple units if spanned across multiple units), the hash may be reconstructed by the data source (e.g., by removing control information and/or other types of data appended to portions of the master hash to facilitate network transport).

At operation 322, the hash of the service tag is used to obtain a challenge. The challenge may be obtained by using it as a key to identify verification data associated with the client. The challenge may be a request for a portion of the verification data associated with the client. The portion of the verification may be selected, for example, randomly or in a deterministic manner.

At operation 324, the challenge is provided to client from which the hash of the service tag was obtained. The challenge may be provided by sending it to the client via a communication system. For example, the challenge may be encoded in a protocol compliant data unit and transmitted to the data source via the communication system. Upon receipt of the protocol compliant data unit (or multiple units if spanned across multiple units), the challenge may be reconstructed by the client (e.g., by removing control information and/or other types of data appended to portions of the challenge to facilitate network transport).

The method may end following operation 324.

Following operation 324, the client may not yet be authenticated to the data source, but the client may have access to the information it needs to provide the data source with information usable to authenticate the client.

Turning to FIG. 3D, a flow diagram illustrating a method of continuing an authentication of a client to a data source in accordance with an embodiment is shown. The method illustrated in FIG. 3D may be performed prior to a client accessing secured data in a data source. For example, the method may be performed when a client initially requests or desires access to secured data in a data source.

At operation 330, a master hash is obtained from the client. The master hash may be obtained by receiving it from the client via a communication system. For example, the master hash may be encoded in a protocol compliant data unit and transmitted to the data source via the communication system. Upon receipt of the protocol compliant data unit (or multiple units if spanned across multiple units), the master hash may be reconstructed by the data source (e.g., by removing control information and/or other types of data appended to portions of the master hash to facilitate network transport).

At operation 332, a copy of the master hash value is obtained using a local copy of verification data associated with the client and a local copy of the hash of the service tag. For example, the copies of the verification data (e.g., that requested in the challenge provided in operation 324) and service tag hash may be obtained from a repository maintained by the data source. These values may be used to form the master hash following a similar procedure employed by the client (e.g., operation 314).

At operation 334 it is determined whether the copy of the master hash obtained in operation 332 matches the master hash obtained in operation 330. If the master hashes match, then the method may proceed to operation 336. Otherwise the method may proceed to operation 338.

At operation 336, a first actions set is performed to continue a mutual authentication of the client and the data source. At this point, the data source may believe that the client is authentic.

The action set may include, for example, initiating performance of a public key exchange. For example, a predetermined process including a number of actions for completing a public key exchange (e.g., the process being known to both participants in the key exchange) may be performed by any of the participants in the exchange.

The method may end following operation 336.

Returning to operation 334, the method may proceed to operation 338 following operation 334 when it is determined that the master hashes obtained in operations 330 and 332 do not match.

At operation 338, a second action set is performed to terminate a mutual authentication of the client and the data source. At this point, the data source may believe that the client is not authentic.

The action set may include, for example, restarting the method of FIG. 3A while terminating other portions of the method being performed.

The method may end following operation 338.

Following the methods shown in FIG. 3A-3D, if successful, the data source may believe that a client is authentic. Following and/or concurrently (or in a partially overlapping in time manner) with these methods, the methods shown in FIGS. 4A-4B may be performed to complete the mutual authentication (e.g., by authenticating the data source to the client).

Figure 3E:
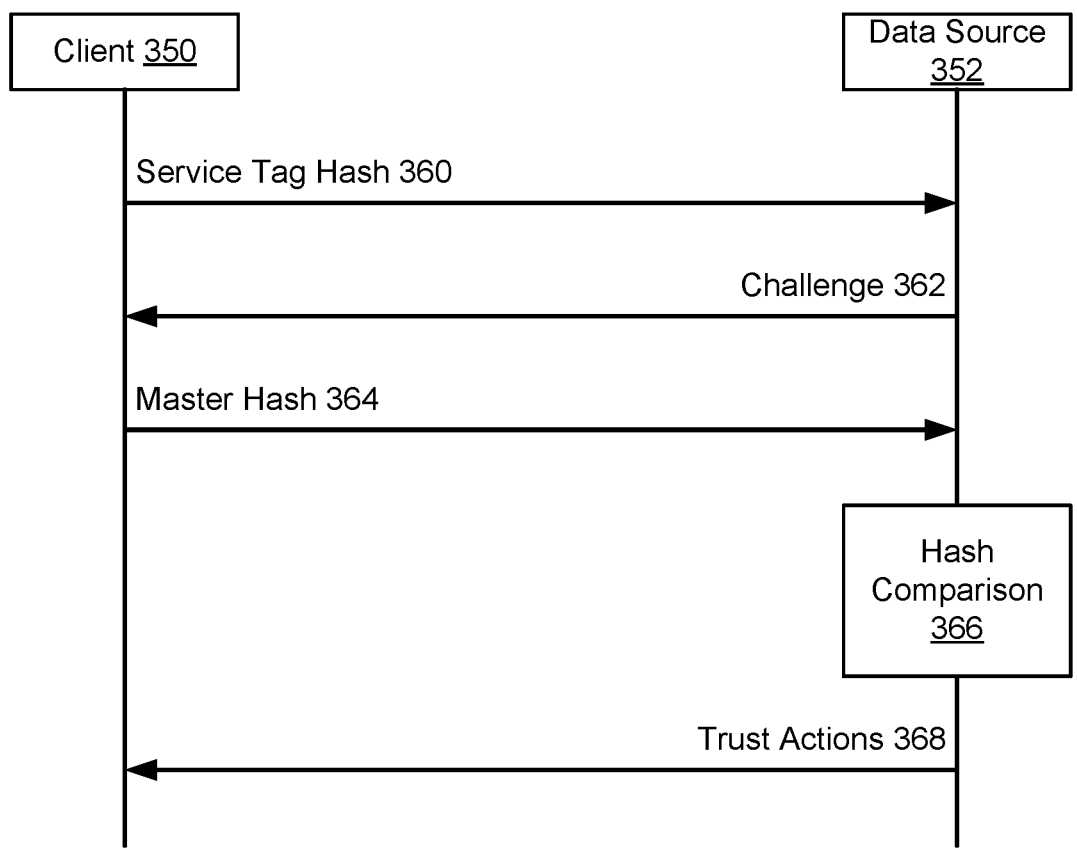
FIG. 3E shows a first interaction diagram between a client and a data source in accordance with an embodiment.

Turning to FIG. 3E, an interaction diagram illustrating interactions between a client 350 and a data source 352 performing the methods of FIGS. 3A-3D in accordance with an embodiment is shown.

Client 350 may initiate performance of the methods based on a desire to access secured data stored in data source 352. For example, a predetermined process to cause the methods to be performed may be initiated. To access the secured data, client 350 and data source 352 may need to perform a mutual authentication.

The mutual authentication may be initiated by client 350 sending service tag hash 360 to data source 352. So long as data source 352 has not authenticated another entity with service tag hash 360, data source 352 may respond by generating and sending challenge 362 to client 350. Challenge 362 may request that client 350 provide a copy of a portion of verification data that data source 352 believes client 350 should be able to access, so long as client 350 is authentic.

For example, data source 352 may use service tag hash 360 as a key to identify verification data corresponding to client 350. Data source 352 may select a portion of the verification data and generate the challenge 362. Challenge 362 may include identification information for the portion of the verification such that, if client 350 has access to the verification data, then client 350 is able to provide a copy of the verification data identified by challenge 362.

Client 350 may use the portion of verification data to obtain master hash 364, which it also may provide to data source 352. Data source 352 may compare master hash 364 to what it believes master hash for client 350 should be to perform hash comparison 366. If the hashes match, then data source 352 may treat client 350 as being authenticated and perform trust actions 368 with client 350. These action may include, for example, sending data usable by client 350 to authenticate data source 352 to client 350. Otherwise, data source 352 may abort (or retry portions of) the authentication process performed. Data source 352 may also perform other actions such as initiating a cool down period to limit the rate at which authentication attempts may be made.

Figure 4A:
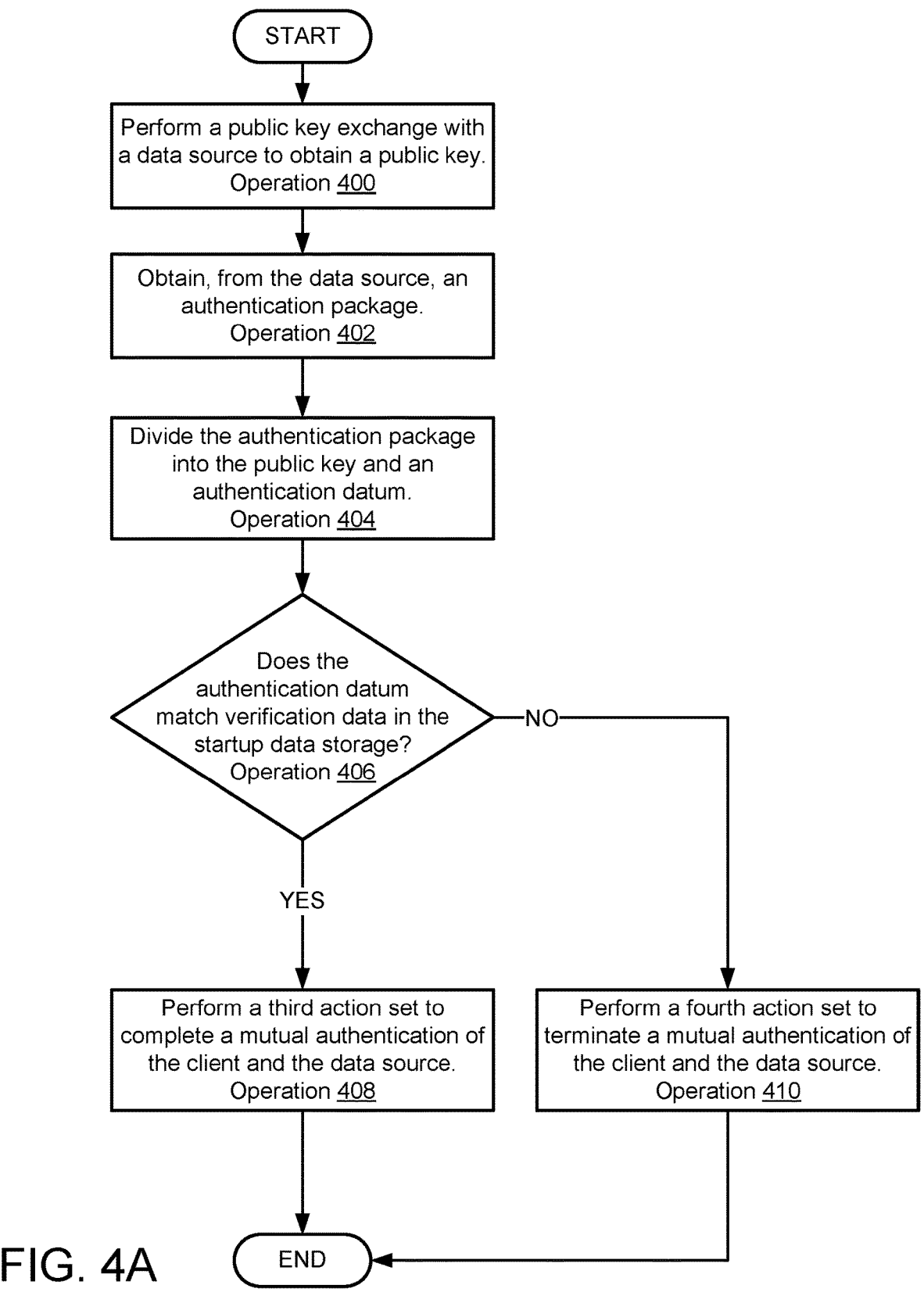
FIG. 4A shows a flow diagram illustrating a method of completing a first portion of a mutual authentication in accordance with an embodiment.
Figure 4B:
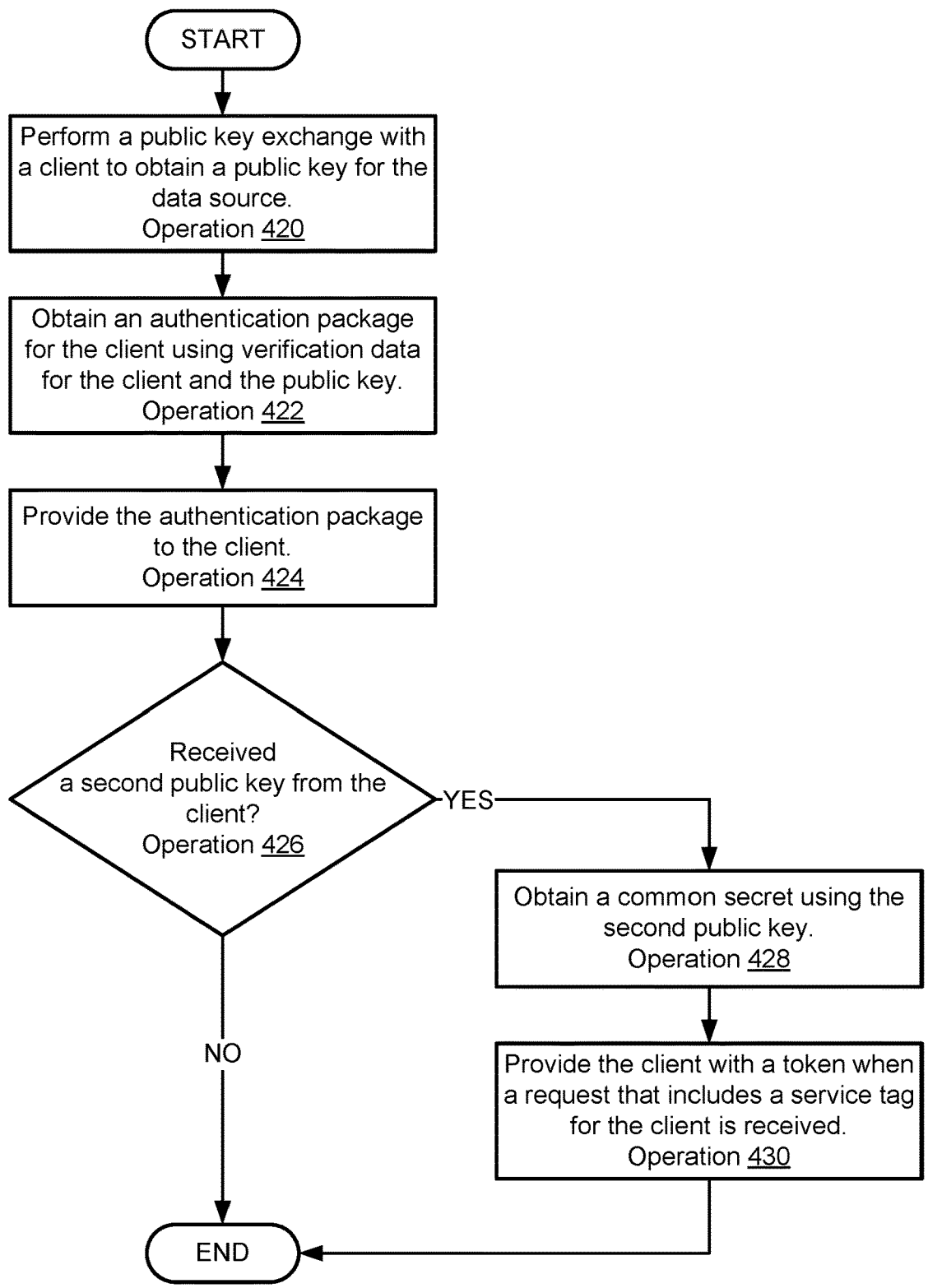
FIG. 4B shows a flow diagram illustrating a method of completing a second portion of a mutual authentication in accordance with an embodiment.
Figure 4C:
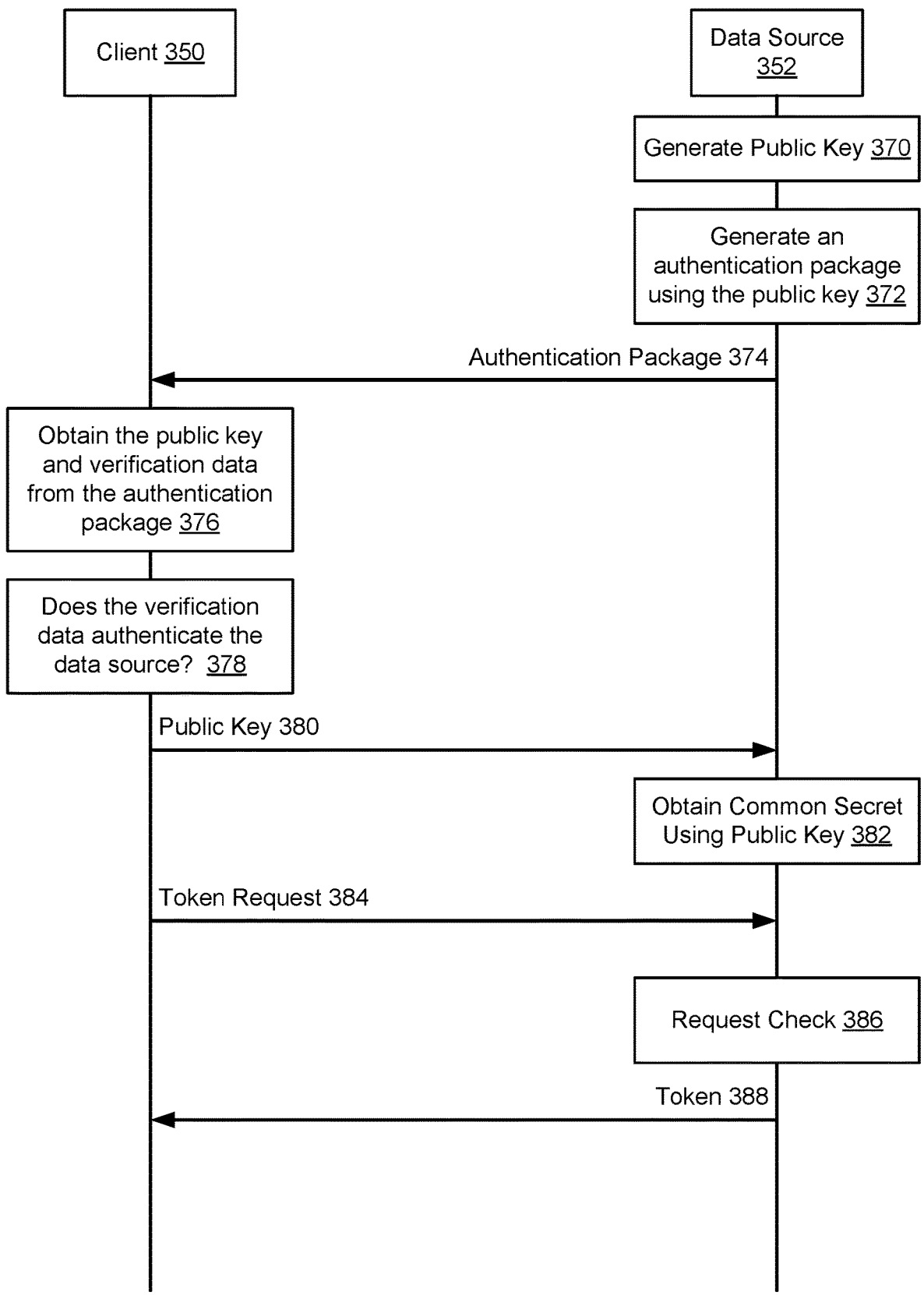
FIG. 4C shows a second interaction diagram between a client and a data source in accordance with an embodiment.

Turning to FIGS. 4A-4C, these figures illustrate methods and operations that may be performed to continue a mutual authentication.

Turning to FIG. 4A, a flow diagram illustrating a method of continuing an authentication of a data source to a client in accordance with an embodiment is shown. The method illustrated in FIG. 4A may be performed prior to a client accessing secured data in a data source. For example, the method may be performed when a client initially requests or desires access to secured data in a data source.

At operation 400, a public key exchange with a data source is performed (e.g., initiated) to obtain a public key. The key exchange may be performed with two publicly known and pre-shared numbers— Mod (P) and Generator (g). The data source may select a secret (secret 1). The client may also choose another secret (secret 2). The data source may generate a Public Key 'Key A' using the formula—Key A=g^(secret 2) mod P.

At operation 402, an authentication package may be obtained from the data source. The authentication package may be sent to the client by the data source. The client may presume that the authentication package has a specific content. For example, the client may presume that the authentication package is Key A joined with all of the verification data associated with the client.

At operation 404, the authentication package is divided into the public key (e.g., of the data source) and an authentication datum. The authentication datum may be the portion of the authentication package that the client believes corresponds to the verification data associated which the client (which the client may assume only an authentic entity is able to access).

At operation 406, it is determined whether the authentication datum matches the verification data in the startup data storage. If the authentication datum matches the verification data in the startup data storage, then the method may perform to operation 408. Otherwise, the method may proceed to operation 410.

At operation 408, a third action set is performed to complete a mutual authentication of the client and the data source. For example, the client may treat the portion of the authentication package corresponding to Key A for the data source as being authentic. The client may continue to the public key exchange initiated in operation 400 to complete the key exchange.

For example, the Client may choose a secret 'b'. The client may create a Public key 'Key B' using the formula— Key B=g^b mod P. The Client may provide Key B to the data source. At this stage, both the client and data source may have the Public Keys (e.g., Key A, Key B) of each other. The Client may use the Key A and derives a secret using the formula—s=A^b mod P. Likewise, the data source uses the Key B of the client and derives a secret using the formula— s=B^a mod P. Consequently, the same secret may be dynamically generated by both the client and the data source. Accordingly, communications and/or subsequent interactions may be secured using the shared, derived secret.

The method may end following operation 408.

Returning to operation 406, the method may proceed to operation 410 if it is determined that the authentication datum does not match (all or a portion of) the verification data in the startup data storage.

At operation 410, a fourth action set is performed to terminate a mutual authentication of the client and the data source. In contrast to operation 408, performance of operation 410 may indicate that the client is unable to authenticate the data source. Consequently, the client may terminate the authentication and/or perform actions to repeat the mutual authentication.

The method may end following operation 410.

Turning to FIG. 4B, a flow diagram illustrating a method of continuing an authentication of a data source to a client in accordance with an embodiment is shown. The method illustrated in FIG. 4B may be performed prior to a client accessing secured data in a data source. For example, the method may be performed when a client initially requests or desires access to secured data in a data source.

At operation 420, a public key exchange with a client is performed to obtain a public key. The key exchange may be performed as described with respect to the description of FIG. 4A to allow for the data source to obtain a public key.

At operation 422, an authentication package for the client is obtained using verification data for the client and the public key. The authentication package may be obtained by joining the public key obtained in operation 420 with the local copy of the verification data associated with the client. The joining may be performed in a prescribed manner known by the client.

At operation 424, the authentication package is provided to the client. The authentication package may be provided to the client by sending it in one or more messages to the client.

At operation 426, it is determined whether, after providing the authentication package to the client, the client provides (e.g., responsively to being provided with the authentication package) a second public key for the client to the data source. If the client does provide the public key, then the method may proceed to operation 428. Otherwise the method may end following operation 426 and the data source may presume that the client was unable to authenticate the data source.

At operation 428, a common secret ("s") is obtained using the second public key ("key_B") from the client. The secret may be derived by calculating key_B^a mod(P), as discussed above.

At operation 430, the client is provided with a token when a request that includes a service tag for the client and/or a copy of the common secret is received. The client may be provided with a token by sending it to the client (e.g., in a communication secured by the shared secret derived using the public keys exchanged between the client and data source). If a request is received that does not include the service tag and/or the common secret, a token may not be provided.

The token may be generated, read from a repository, or obtained via other methods. When provided to the client, the token may be recorded as being live and/or associated with the client. The data source may use the token as a way of determining whether the client is authorized to access secured data it hosts.

The method may end following operation 428.

Turning to FIG. 4C, an interaction diagram illustrating interactions between a client 350 and a data source 352 performing the methods of FIGS. 4A-4B in accordance with an embodiment is shown.

Client 350 may initiate performance of the methods based on a desire to authenticate data source 352. In other words, to continue a mutual authentication started, for example, as shown in FIG. 3E.

To continue the mutual authentication, data source 352 may generate public key 370. Using the public key, data source 352 may generate an authentication package 372 and provide the authentication package 374 to client 350. The authentication package may include the public key joined with a copy of the verification data associated with the client that is maintained by data source 352.

Once obtained, client 350, may obtain the public key and the copy of the verification data from the authentication package 376. Client 350 may determine whether the verification data authenticates the data source 378. Client 350 may do so by comparing the copy of the verification data from data source 352 to its copy of the verification data maintained in startup data storage. The data source may be treated as authentic when the copy of the verification data from data source 352 matches the verification data maintained by client 350.

When the data source is authenticated, client 350 may generate and provide a public key 380 to data source 352, thereby allowing client 350 and data source 352 to complete the key exchange.

For example, data source 352 may perform a process to obtain a common secret using the public key 382. The common secret may be used, in part, to ascertain whether subsequently obtained requests for tokens should be satisfied.

Consequently, when client 350 sends token request 384 to data source 352, data source 352 may perform request check 386 and ascertain whether token request 384 includes a copy of a service tag for client 350 and a copy of the shared secret (e.g., which client 350 may generate using the public key 370 from data source 352).

When request check 386 indicates that the token request 384 should be satisfied (e.g., by including the service tag and the shared secret), then data source 352 may provide token 388 to the client 350. Once obtained, client 350 may utilize token 388 to authenticate itself and/or its requests to data source 352 in the future.

Figure 5:
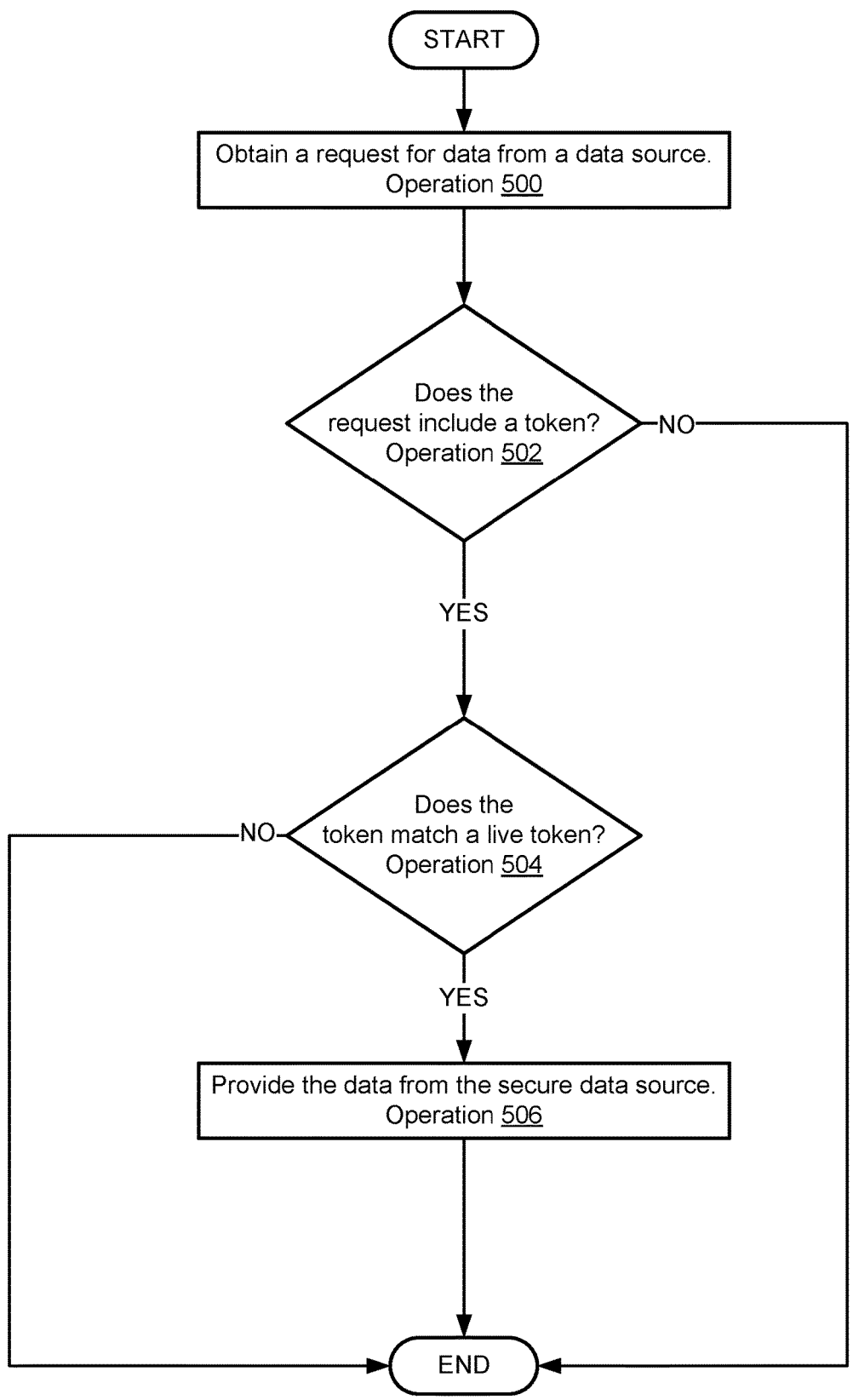
FIG. 5 shows a flow diagram illustrating a method of servicing a data access request between a client and a data source in accordance with an embodiment.

Turning to FIG. 5, a flow diagram illustrating a method of servicing a data access request in accordance with an embodiment is shown. The method illustrated in FIG. 5 may be performed when a client requests secured data in a data source.

At operation 500, a request for data from a data source is obtained. The request may request access to data that is secured in the data source with a token required for access.

At operation 502, it is determined whether the request includes a token. If the request does not include the token, then the method may end and access to the data may be denied. If the request includes a token, then the method may proceed to operation 502.

At operation 504, it is determined whether the token matches a live token. The determination may be made by comparing the token to a list (or other data structure) specifying the live tokens.

It also may be determined whether the token is associated with the entity requesting the data from the data source. The determination may be made using the list which may also indicate to which clients live tokens are associated.

If both determinations are positive (e.g., match and the token is associated with requesting entity), then the method may proceed to operation 506. Otherwise the method may end and access to the data may be denied.

At operation 506, the data from the secured data source is provided to the requesting entity. The data may be provided to the requesting entity (e.g., a client) by sending it to the client using one or more messages. The data may be provided via other methods without departing from embodiments disclosed herein.

The method may end following operation 506.

Figure 6:
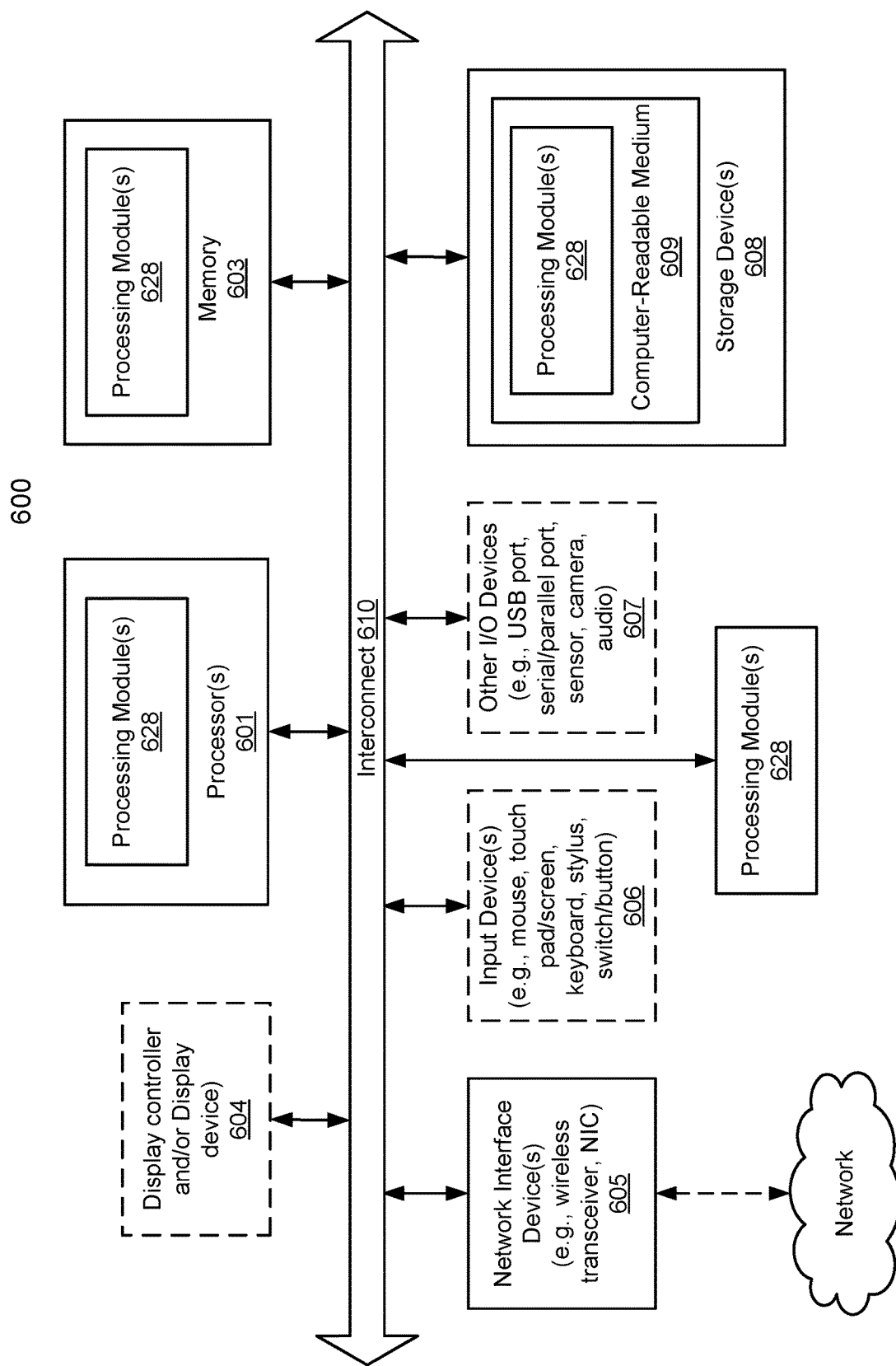
FIG. 6 shows a block diagram illustrating a computing device in accordance with an embodiment.

As discussed above, various components may be implemented with computing devices. For example, any of the components illustrated in FIGS. 1-5 may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI).

This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for securing data in a data source using tokens, the method comprising:
performing, by the data source and a client that desires access to secured data stored in the data source, a mutual authentication process to establish a trusted environment between only the data source and the client, performance of the mutual authentication process comprising at least both of:
  performing, by the data source, a first authentication to authenticate the client to the data source by using, at least:
    a copy of a service tag of the client that is stored in the data source, and
    a copy of a first portion of a startup data of the client, the startup data causes a predetermined entity to be started up when the startup data is executed by the client during a startup of the client and is stored in a startup data storage of the client, the copy of the first portion of the startup data is stored in the data source and the service tag is used to identify the copy of the first portion of the startup data for use during the authentication; and
  performing, by the client, a second authentication to authenticate the data source to the client by using at least:
    the copy of the service tag of the client stored in the data source, and
    a copy of a second portion of the startup data, the copy of the second portion of the startup data is stored in the data source and the service tag is used to identify the copy of the second portion of the startup data for use during the authentication,
  wherein the first authentication and the second authentication are performed concurrently in an overlapping in time manner,
  wherein the mutual authentication process is successful and the trusted environment is established when the first authentication indicates to the data source that the client is authentic and the second authentication indicates to the client that the data source is authentic, and
  wherein the mutual authentication process is unsuccessful and the client is denied access to the secured data stored in the data source when either the first authentication or the second authentication indicates that one of the client and the data source are not authentic;

providing, by the data source and only after the mutual authentication process is successful, a token to the client, the token provided by the data source grants the client access to secured data.

2. The computer-implemented method of claim 1, wherein the client is a computing device, the startup data comprises computer code executed during the startup of the client, and the first portion of the startup data is provided to verify a portion of the computer code executed during the startup of the client.

3. The computer-implemented method of claim 2, wherein the second portion of the startup data is provided to verify all of the computer code executed during the startup of the client.

4. The computer-implemented method of claim 1, wherein the first portion comprises a signature of computer code of a startup entity of the client that executes the startup data at the startup of the client, the signature and computer code being stored in a secure storage device of the client.

5. The computer implemented method of claim 1, wherein performing the first authentication further comprises:
providing, by the client, a hash of the service tag to the data source;
making a determination, by the data source, that the hash indicates that the client may be a known entity;
in response to the determination, and by the data source:
generating a challenge based on the copy of the first portion of the startup data; and
presenting the challenge to the client;
receiving a response to the presented challenge from the client; and
using the challenge response to determine whether the client is authentic.

6. The computer implemented method of claim 1, wherein performing the second authentication comprises:
performing a key exchange between the client and the data source to provide the data source with a public key;
generating an authentication package with the public key and the copy of the second portion of startup data stored in the startup data storage of the client; and
providing the generated authentication package to the client.

7. The computer implemented method of claim 1, wherein the first authentication and the second authentication are performed concurrently in the overlapping in time manner such that the client does not have to be fully authenticated by the data source first before the second authentication is initiated.

8. The computer implemented method of claim 1, wherein copy of the service tag of the client is stored in an authentication data repository hosted by the data source within a storage device of the data source, the authentication data repository being separate from a secured data repository within the storage device that stores the secured data.

9. The computer implemented method of claim 1, wherein the mutual authentication process is initiated between the client and the data source when the data source receives a hash of the service tag of the client from the client.

10. The computer implemented method of claim 9, wherein, after receiving the hash of the service tag of the client of the client, the data source automatically presumes the client as not authentic if the data source determines that the hash of the service tag has previously been obtained from another entity different from the client.

11. A client for providing computer implemented services using secured data stored in a data source, comprising:
startup storage for storing:
startup data, and
verification data that verifies that a predetermined entity will be started up when the startup data is executed by the client during a startup of the client;
memory; and
a processor adapted to execute computer instructions that cause the processor to:
perform, with the data source, a mutual authentication process to establish a trusted environment between only the data source and the client, the mutual authentication process comprising at least both of:
performing a first authentication to authenticate the client to the data source using:
a service tag of the client, and
a portion of the verification data;
performing a second authentication to authenticate the data source to the client using all of the verification data,
wherein the mutual authentication process is successful and the trusted environment is established when the first authentication indicates to the data source that the client is authentic and the second authentication indicates to the client that the data source is authentic, and
wherein the mutual authentication process is unsuccessful and the client aborts attempts to access the secured data when the second authentication indicates to the client that the data source is not authentic; and
obtain, only after the mutual authentication process is successful, a token from the data source, the token granting the client access to the secured data.

12. The client of claim 11, wherein the portion of the verification data comprises a signature of a portion of the startup data.

13. The client of claim 11, wherein performing the first authentication further comprises, by the client:
providing a hash of the service tag to the data source;
after providing the hash:
obtaining, from the data source, a challenge based on the portion of the verification data;
generating a response to the challenge, the response being based on the portion of the verification data; and
providing the response to the data source, the response being used by data source to authenticate the client to the data source.

14. The client of claim 13, wherein the challenge indicates the portion of the verification data.

15. The client of claim 13, wherein the challenge selects a different portion of the verification data each time the client is challenged.

16. The client of claim 11, wherein performing the second authentication comprises:
performing a key exchange with the data source to obtain publicly known numbers usable to obtain a public key for the client;
obtaining an authentication package from the data source, the authentication package being based, at least in part, on the key exchange;
segregating the authentication package into a second public key for the data source and a copy of all of the authentication data; and comparing the copy of all of the authentication data and the authentication data stored in the startup storage to obtain an authentication status for the data source.

17. A data source for securing data stored in a data source, comprising:

storage for storing a copy of verification data stored in a client and a service tag of the client, the verification data verifies that a predetermined entity will be started up when the startup data is executed by the client during a startup of the client;

memory; and a processor adapted to execute computer instructions that cause the processor to:

perform, with the client, a mutual authentication process to establish a trusted environment between only the data source and the client, the mutual authentication process comprising at least both of:

performing a first authentication to authenticate the client to the data source using:

the service tag of the client stored in the storage, and a portion of the copy of the verification data;

performing a second authentication to authenticate the data source to the client using all of the copy of the verification data, wherein the mutual authentication process is successful and the trusted environment is established when the first authentication indicates to the data source that the client is authentic and the second authentication indicates to the client that the data source is authentic, and wherein the mutual authentication process is unsuccessful and the client is prevented by the data source from accessing the data secured in the data source when the first authentication indicates to the data source that the client is not authentic; and provide, only after the mutual authentication process is successful, a token to the client, the token granting the client access to the data secured in the data source.

18. The data source of claim 17, wherein the portion of the copy of the verification data comprises a signature of a portion of startup data usable by the client to enter a predetermined state.

19. The data source of claim 17, wherein performing the first authentication further comprises, by the processor of the data source:

obtaining a hash of the service tag from the client;

after obtaining the hash:

providing, to the client, a challenge based on the portion of the verification data;

obtaining, from the client, a response to the challenge, the response being based on the portion of the verification data; and using the challenge response to authenticate the client to the data source.

20. The data source of claim 17, wherein performing the second authentication comprises:

performing a key exchange with the client to obtain publicly known numbers usable to obtain a public key;

generating an authentication package based, at least in part, on the key exchange and all of the copy of the authentication data;

providing the authentication package to the client; and receiving a public key from the client when the client authenticates the data source using the authentication package.

* * * * *